United States Patent [19]

Higgins

[11] Patent Number: 4,520,155

[45] Date of Patent: May 28, 1985

[54] DYE-RECEPTIVE POLYOLEFINS AND POLYOLEFIN FIBERS

[75] Inventor: William A. Higgins, Gates Mills, Ohio

[73] Assignee: The Lubrizol Corporation, Wickliffe, Ohio

[21] Appl. No.: 603,066

[22] Filed: Apr. 23, 1984

[51] Int. Cl.³ .............................................. C08K 5/42
[52] U.S. Cl. ..................................... 524/166; 524/581
[58] Field of Search ................................ 524/166, 581

[56] References Cited

U.S. PATENT DOCUMENTS

| | | | |
|---|---|---|---|
| 2,094,489 | 9/1937 | Hueter ................................ | 568/681 |
| 2,989,547 | 6/1961 | Whyte ................................ | 568/676 |
| 3,036,034 | 5/1962 | Rumscheidt ........................ | 524/166 |
| 3,043,812 | 7/1962 | Armen et al. . | |
| 3,327,021 | 6/1967 | Binsbergen ........................ | 524/166 |
| 3,376,277 | 4/1968 | Seifert et al. ...................... | 524/166 |
| 3,402,222 | 9/1968 | Zutty et al. ........................ | 526/287 |
| 3,583,941 | 6/1971 | Trapasso et al. ................... | 524/166 |
| 3,816,370 | 6/1974 | Miller et al. . | |
| 3,923,755 | 12/1975 | Piloni . | |
| 4,028,480 | 6/1977 | Le Brasseur ....................... | 524/166 |

FOREIGN PATENT DOCUMENTS

| | | | |
|---|---|---|---|
| 0731225 | 3/1966 | Canada ............................... | 524/166 |
| 2336097 | 2/1975 | Fed. Rep. of Germany ...... | 524/166 |
| 2823507 | 12/1979 | Fed. Rep. of Germany ...... | 524/166 |
| 995802 | 6/1965 | United Kingdom . | |

*Primary Examiner*—Paul R. Michl
*Assistant Examiner*—N. Sarofim

*Attorney, Agent, or Firm*—Denis A. Polyn; Raymond F. Keller; Danison, Jr. Walter C.

[57] ABSTRACT

Polyolefin compositions are described which can be dyed by conventional dyeing techniques. Such polyolefins comprise a blend of (A) a polyolefin and (B) a dye-receptive amount of at least one metal sulfonate which is soluble in the polyolefin when melted, and which sulfonates are characterized by the formulae

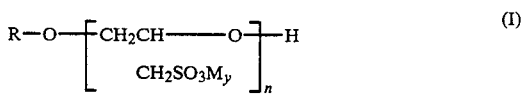

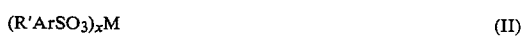

wherein R is an aliphatic group, R' is an aliphatic group containing at least about 8 carbon atoms, Ar is an aromatic group, M is an alkali or alkaline earth metal, n is at least 1, y is equal to 1 when M is an alkali metal and ½ when M is an alkaline earth metal, and x is equal to the valence of M.

The preferred sulfonates are those represented by Formula (I) and especially wherein M is sodium. In particular, it has been found that films and fibers prepared from such polyolefin composition, and more particularly polypropylene compositions, are readily dyed with common dyes to provide deep shades and fastness.

23 Claims, No Drawings

DYE-RECEPTIVE POLYOLEFINS AND POLYOLEFIN FIBERS

BACKGROUND OF THE INVENTION

This invention relates to polyolefin compositions and, more particularly, to polyolefin compositions which can be used to produce fibers and related filamentous structures which are readily dyed by conventional dying techniques, and to films having improved dyeability and printability.

Polyolefins, and more particularly, polypropylene have found wide spread use in the production of films and fibers.

Fibers and films of polypropylene, both homopolymers and copolymers, are well known. However, these fibers have proven to be exceedingly difficult to dye with common dyes, especially from an aqueous bath. This serious disadvantage has severely restricted the use of polypropylene.

Suggestions have been made in the art to improve the dyeability of polypropylene. For example, graft polymerization to the polyolefin with dye-receptive comonomers has been suggested, but this often effects the spinnability of the copolymer and has not been widely adopted. Attempts also have been made to improve the dyeability of polyolefins by blending the polyolefin with other materials such as polyurethanes, polyamides and epoxy resins. Generally, these procedures result in moderate improvements of the dyeability, but the improvements are offset by other problems such as poor compatibility resulting in generally unacceptable product uniformity. U.S. Pat. No. 3,402,222 describes a polypropylene composition whose dyeing characteristics have been improved by mixing a polypropylene with a copolymer of an alkoxy ethyl acrylate and certain polar comonomers such as, for example, sodium 2-acrylamido-2-methyl propane sulfonate.

British Pat. No. 995,802 describes compositions of polyolefins having improved dyeability, and these compositions comprise blends of (1) a solid homopolymer or copolymer of a mono alphaolefin and (2) a copolymer of a major amount of interpolymerized ethylene and a minor amount of certain specified comonomers such as N-vinyl pyrrolidones, N-vinyl succinimides, acrylamides, acrylic acids and esters, vinyl sulfonic acids, vinyl esters (e.g., vinyl propionate) and dialkylvinyl phosphine oxides.

In spite of the suggestions made in the prior art, the generally recognized commercial method for coloring polypropylene fibers is spin coloration with pigments. The most important pigments are the organic pigments although titanium dioxide and carbon blacks also are used.

Although improvements have been made in the dyeability of polyolefins such as polypropylene, the dyeability characteristics have not been entirely satisfactory in depth of shade or fastness properties. Also, films from the polypropylene resins have been found to be difficult to print on, and expensive and time-consuming procedures such as flame treatment or radiation have been employed to improve printability properties of such films.

SUMMARY OF THE INVENTION

It now has been found that the dye-receptivity of polyolefins, and particularly, polypropylene, can be improved by incorporating into the polyolefins, a dye-receptive amount of at least one metal sulfonate which is soluble in the polyolefin when the polyolefin is melted and which sulfonates are characterized by the formulae

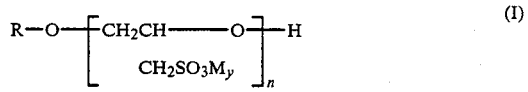

wherein
R is an aliphatic group,
R' is an aliphatic group containing at least about 8 carbon atoms,
Ar is an aromatic group,
M is an alkali or alkaline earth metal,
n is at least 1,
y is equal to 1 when M is an alkali metal and ½ when M is an alkaline earth metal, and
x is equal to the valence of M.

Generally, amounts of the sulfonates of up to about 10% by weight based on the weight of the polyolefin are incorporated into the polyolefin and provide satisfactory results. In particular, it has been found that films and fibers prepared from such modified polypropylene compositions are readily dyed with common dyes and provide deep shades and fastness.

DESCRIPTION OF THE PREFERRED EMBODIMENTS

The present invention relates to dyeable polyolefin compositions and methods of preparing such improved compositions. More particularly, the compositions of the invention are prepared from a blend of
(A) a polyolefin, and
(B) a dye-receptive amount of at least one metal sulfonate of the formulae

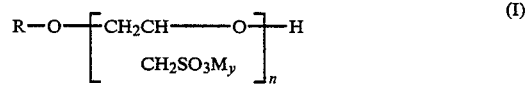

wherein
R is an aliphatic group,
R' is an aliphatic group containing at least about 8 carbon atoms,
Ar is an aromatic group,
M is an alkali or alkaline earth metal,
n is at least 1,
y is equal to 1 when M is an alkali metal and ½ when M is an alkaline earth metal, and
x is equal to the valence of M.

The polyolefins used to prepare the dyeable blends of this invention include the homopolymers and copolymers of mono-alpha olefins having from 2 to 10 carbon atoms, preferably from 2 to 5 carbon atoms. Polypropylene and copolymers of propylene with other olefins are particularly preferred. For convenience in this specification, the discussion may generally refer to polypropylene. However, the discussion shall also be considered as applicable to copolymers of propylene monomer and other olefins.

Although the invention is useful for improving the dye-receptivity of polyolefins in general, it has been found that the dye-receptive properties of polypropylene particularly are improved by the process of the invention. Generally, the polypropylenes used to prepare the blends of the invention are solid polypropylenes and preferably have a melt index of from about 0.1 decigram/minute to about 100 decigrams/minute measured at 230° C. and a density greater than about 0.89 gram/cc. Polypropylenes having these characteristics are readily available commercially.

The metal sulfonates which are included in the polyolefin compositions of the invention and which improve the dye-receptivity of the polyolefin compositions are sulfonates which are soluble in the polyolefin when the polyolefin is melted for extrusion, etc. Preferably, the sulfonates are represented by the formula

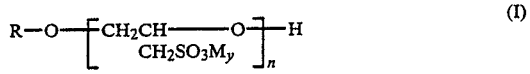
(I)

wherein, R is an aliphatic group, M is an alkali or alkaline earth metal, n is at least 1, and y is 1 when M is an alkali metal and $\frac{1}{2}$ when M is an alkaline earth metal. Sulfonates of the type represented by Formula I are referred to generally as high molecular alkyl glyceryl ether sulfonates. Methods for preparing alkyl glyceryl ether sulfonates of the type represented by Formula I have been described in the prior art, and compositions of this type are available commercially. Such compositions where M is an alkali metal, and more particularly where M is sodium are preferred.

One method which has been suggested for preparing compounds of the type represented by Formula I involves the reaction of an excess of epichlorohydrin with a high molecular weight alcohol whereby alkyl polychloroglyceryl ethers are formed along with alkyl monochloroglyceryl ethers. Sulfonates are formed from these ethers through the normal Streckerization reaction, that is, by treatment with an alkali metal sulfite. Alternatively, the sulfonate can be prepared by reacting the halo ether with a combination of alkali metal sulfite and bisulfite. Examples of prior art patents describing methods of preparing sulfonates of the type represented by Formula I include U.S. Pat. Nos. 2,094,489 and 2,989,547.

The metal sulfonates represented by Formula I can be prepared by the alkoxylation of mono-hydroxy- or poly-hydroxy-alkyl sulfonic acids with higher molecular weight fatty alcohols, e.g., by the alkoxylation of hydroxy-ethane-sulfonic acid or di-hydroxy propane sulfonic acid. In accordance with the preferred procedure, one or more fatty alcohols having from about 8 to 24 carbon atoms are reacted with an equal molar amount of epichlorohydrin or propylene oxide, or an excess of said epichlorohydrin or propylene oxide (in an amount sufficient to provide the product having the desired n value in Formula I) in the presence of a suitable catalyst. If propylene oxide is utilized as the reactant, the hydroxyl group which is formed is converted to a halide by reaction with hydrogen halide and the halogen is then replaced by the sulfonic acid group. When epichlorohydrin is utilized as the reactant with the fatty alcohol mixtures, a chlorine atom is present in the intermediate product. In either procedure, the chlorine atom then is replaced by the desired sulfonic acid group by reaction with sulfuric acid and a slight excess of sodium sulfite, generally in an autoclave. This latter procedure for introducing sulfonic acid groups is known as the Streckerization reaction.

The sulfonates of the type represented by Formula I which are useful in this invention are those which are soluble in the melted polyolefin. Thus, the nature of the R groups and M metal, as well as the value of n are selected and may be varied to achieve the desired solubility. Generally, the R group will contain from about 8 to 24, and preferably from abut 10 to 24 carbon atoms, M will be an alkali metal, and n will be from about 1 to 4. Mixtures of alkali metal sulfonates wherein the average of n is from about 1 to 2 are particularly useful.

In one embodiment, the fatty alcohols which are useful in the preparation of the sulfonates of the invention are the aliphatic alcohols with at least 8 carbon atoms in the molecule and the naphthenic alcohols. Examples of suitable aliphatic alcohols include octyl-, decyl-, dodecyl-, myristyl- and cetyl alcohol, and the alcohol mixtures obtained by high pressure reduction from natural greases such as cocoa fat, tallow, and palm kernel oil. Oxo alcohols also can be used in the preparation of the metal sulfonates of the invention. Mixtures of fatty alcohols derived from various natural oils such as coconut oil are useful. An example of such a mixture is the "middle cut" of the fatty alcohol derived from coconut oil which contains largely $C_{12}$ and $C_{14}$ fatty alcohols.

Unsaturated alcohols such as oleyl alcohol and its homologs can be utilized, as well as polyhydroxy saturated or unsaturated alcohols such as hydroxy stearyl alcohol or ricinoleyl alcohol obtained by reducing castor oil. Accordingly, when the terms aliphatic or alkyl are utilized in describing the metal sulfonates, the terms are understood to include within their scope the alkenyls as well as the true alkyls.

It should also be understood that although in the foregoing discussion, only sodium sulfite and sodium bisulfite had been discussed in conjunction with the Streckerizing and/or sulfonating agents, other alkali metal sulfites, such as potassium sulfite and bisulfite also can be utilized to prepare the metal sulfonates of the invention. Furthermore, when it is desired to have salts other than sodium or potassium salts such as, for example, the alkaline earth metal salts including calcium and magnesium, the sodium salt, for example, can be passed over an ion exchange resin to replace sodium ion with a hydrogen ion, and the resulting acid neutralized with calcium or magnesium hydroxide.

The sulfonates useful in this invention also can be represented by the formula $(R'Ar\ SO_3)_xM$ (II)

wherein R' is an aliphatic group containing at least 8 carbon atoms, Ar is an aromatic group, M is an alkali or alkaline metal, and x is equal to the valence of M. Generally, R' will contain from about 8 to 24, and more preferably, from about 10 to 24 carbon atoms, and M is an alkali metal. The aromatic group generally will be either a phenyl or a naphthyl group, and is preferably a phenyl group. The alkali metals are preferred and sodium particularly is preferred.

Sulfonates of the type represented by Formula II are available commercially from a variety of sources. These sulfonates generally are referred to as alkyl aryl sulfonates. Examples of useful sulfonates include sodium octyl benzene sulfonate, sodium decylbenzene sulfonate, sodium dodecyl benzene sulfonate, sodium octadecyl benzene sulfonate, sodium decyl naphthalene sulfonate, and the corresponding potassium and calcium derivatives.

The polyolefin and metal sulfonates can be blended together in amounts varying over rather wide ranges. In general, the amount of metal sulfonate blended with the polyolefin will be an amount which is sufficient to provide the blended mixture with the desired dyeability characteristics. Preferably, the compositions of the invention will comprise up to about 10% by weight of the metal sulfonate, and more preferably, from about 2 to about 7% by weight of the sulfonate, based on the weight of the polyolefin.

The metal sulfonates of the present invention have been found to be particularly compatible with polyolefins, and more particularly with polypropylenes. The blending of the polyolefin and metal sulfonate can be effected by any of the conventional means, such as dough mixers, roll mixers, or Banbury mixers; by extrusion; or by fluxing the solid polymers. If desired, solution or dispersion mixing can be used by proper selection of solvents and diluents.

When a two-roll mill or a Banbury mixer is employed, blending can easily be effected at temperatures above the melting point of the polymer, for example, from about 150° to about 250° C., preferably from about 165° to about 185° C. The temperature selected should not be so high as to result in degradation of the polyolefin or of the metal sulfonate. If desired, fillers, anti-oxidants, heat stabilizers, light stabilizers, delusterants, and other known additives can be added to the blend.

The dyeable polyolefin compositions of the present invention especially are useful in forming fibers, and related filamentous structures. Staple fibers can be prepared as flat, round, trilobal, delta, star-shaped, and hollow fibers. The polypropylene compositions of the invention also can be used in the preparation of continuous filament and bulked continuous filament (BCF) yarns.

Fibers can be spun from the polyolefin compositions by conventional spinning techniques. For example, the compositions can be melt-spun or solution-spun, and the filaments can then be stretched to orient the molecules and develop the desired tensile properties in the fibers. Extrusion techniques also are used to prepare the shaped structure utilizing the compositions of the invention. The preferred compositions for fiber applications are those prepared from polypropylene blends containing from about 2 to 7% by weight of the metal sulfonates.

Polypropylene fibers produced from the compositions of this invention can be dyed readily by conventional dyeing techniques to produce much deeper shades of color than have heretofore been obtainable from unmodified polypropylene fibers. Among the dyes that can be used are the well known acid dyes, basic dyes, disperse dyes, soluble vat dyes, azoic dyes, and premetallized dyes. In a typical dyeing procedure with the acid dyes and premetallized dyes, a 50:1 dye bath ratio can be used, the bath containing 1% by weight of a methyl polyethanol quaternary amine, 2% by weight of sulfuric acid, and 3% by weight of the dye, all based on the weight of the fiber. The dyeing is carried out for 90 minutes at the boil, and the fiber is then rinsed, scoured and dried. When a disperse dye is used, a typical dye bath contains 1% sodium N-methyl-N-oleyl taurate, 2% of the disperse dye, a dye bath ratio of about 40:1 and a one hour boiling time. For basic dyes, dyeing usually can be effected in about 90 minutes at the boil in a bath having a dye bath ratio of about 40:1, and containing 1% of an alkyl phenyl polyethylene glycol and 2% of the basic dye. If desired, known dye carriers can be employed in the bath to assist dyeing.

The polyolefin compositions, and particularly the polypropylene compositions of this invention are readily extruded by conventional procedures to produce rods, films, and protective coatings. The products so obtained are clear, tough compositions. The films are amenable to printing by conventional procedures without further surface treatment of the film being necessary.

The following examples illustrate the preparation of the dyeable polyolefin compositions of the invention. Unless otherwise indicated, all parts and percentages are by weight.

EXAMPLE 1

A polypropylene blend is prepared by incorporating about 2.79% by weight of a sodium sulfonate mixture characterized by the formula

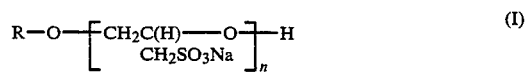

wherein R is a mixture of aliphatic groups containing 12 and 14 carbon atoms and the average of n is about 1.5. The sodium sulfonate is dispersed in just enough water to enable the dispersion to cover the polypropylene when thoroughly mixed. The coated polypropylene is dried with occasional stirring in a forced air oven at about 85° C.

The polypropylene blend is passed through an extruder with the barrel temperature zones set at a temperature of about 185° C. and the die temperature at 182° C. at 40 rpm. Ribbons, ¾-inch to 1-inch wide are formed in this manner. The ribbons are light in color and clearer than polypropylene containing none of the sodium sulfonate. The ribbon also is found to be less brittle than untreated polypropylene ribbon.

EXAMPLE 2

Polypropylene is blended with about 3% by weight of a mixture of sodium sulfonates having the formula specified in Example 1 above, but wherein the R groups comprise a mixture of 12 to 14 carbon atoms and 16 to 18 carbon atoms. The polypropylene blend is prepared in the same manner as described in Example 1 above, and the blend is converted to ribbons by passing through a Brabender extruder as in Example 1. The ribbons obtained in this manner are light in color and are slightly clearer than untreated polypropylene.

EXAMPLE 3

The procedure of Example 2 is repeated except that 6% of the sodium sulfonate mixture is incorporated into the polypropylene.

EXAMPLE 4

The procedure of Example 1 is repeated except that the sulfonate is replaced by 2.25% of sodium dodecyl benzene sulfonate.

The dyeability of the treated polyolefin compositions of the invention is illustrated by the following example.

EXAMPLE A

A dye solution is prepared by mixing 0.625 parts of ammonium acetate in 3.5 parts of Malachite Green into 500 parts of distilled water with stirring for about two hours. The solution is decanted from any undissolved dye. The pH of the solution is adjusted to 5.2 with dilute ammonium hydroxide. Fifty parts of this dye solution are poured into glass jars, and two sample strips of both treated and untreated polypropylene are placed separately in jars so that half of each strip is immersed in the dye solution. The jars are covered and placed in a forced-air oven at 85° C. for two hours. The strips then are removed from the jars and thoroughly rinsed with tap water. The dyed samples are boiled in 3.5 liters of water for 10 minutes. One sample from each is also boiled in 3.5 liters of water with 10 ml. of a liquid soap concentrate added.

In each material tested, there appears to be no difference between the samples that are boiled in water and those that are also boiled in soapy water. The control sample (polypropylene containing no sodium sulfonate) appears to retain very little dye immediately after removal from the dye solution and boiling solutions. However, upon standing several days, the color in these samples darkens considerably. On the other hand, the polypropylene samples containing sodium sulfonates such as the ribbons of Examples 1–4, after dyeing and boiling, are much darker than the untreated samples. Even when allowed to stand for several days, the color in these samples prepared in accordance with the invention is much more vivid than the untreated samples and appears to be absorbed into the polypropylene.

I claim:

1. A dyeable polyolefin composition comprising a blend of (A) a polyolefin and (B) a dye-receptive amount of at least one metal sulfonate which is soluble in the polyolefin when melted, and which sulfonate is characterized by the formula

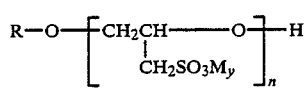

(I)

wherein
R is an aliphatic group,
M is an alkali or alkaline earth metal,
n is at least 1,
y is equal to 1 when M is an alkali metal and ½ when M is an alkaline earth metal.

2. The polyolefin composition of claim 1 wherein R is n aliphatic group containing at least about 8 carbon atoms.

3. The polyolefin composition of claim 1 wherein n is from about 1 to 4.

4. The polyolefin composition of claim 1 wherein R is an aliphatic group containing from about 10 to 24 carbon atoms.

5. The polyolefin composition of claim 1 wherein the blend contains up to about 10% by weight of the sulfonate.

6. The composition of claim 1 containing from about 2 to 7% by weight of the metal sulfonate.

7. The composition of claim 1 wherein M is an alkali metal.

8. The composition of claim 1 wherein the sulfonate comprises a mixture of sulfonates of Formula I wherein the average of n is from 1 to about 2.

9. The composition of claim 1 wherein the polyolefin is a polypropylene.

10. A dyeable polypropylene composition comprising a blend of (A) about 90 to 98% by weight of a solid propylene and (B) from about 2 to 10% by weight of at least one metal sulfonate of the formula

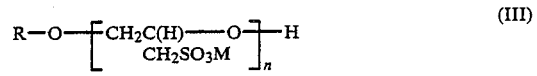

(III)

wherein R is an aliphatic group containing from about 10 to 24 carbon atoms, M is an alkali metal, and n is from 1 to about 4.

11. The composition of claim 10 wherein the sulfonate comprises a mixture wherein R contains from about 12 to 18 carbon atoms.

12. The composition of claim 10 wherein the alkali metal is sodium or potassium.

13. The composition of claim 10 wherein the sulfonate comprises a mixture of sulfonates wherein the average of n is from 1 to about 2.

14. The composition of claim 1 in the form of fibers.

15. The composition of claim 10 in the form of fibers.

16. A process for improving the dyeability characteristic of polyolefins which comprises including in the polyolefin a dye-receptive amount of at least one metal sulfonate which is soluble in the polyolefin when melted, and which sulfonates are characterized by the formula

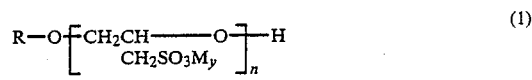

(I)

wherein
R is an aliphatic group,
M is an alkali or alkaline earth metal,
n is at least 1,
y is equal to 1 when M is an alkali metal and ½ when M is an alkaline earth metal.

17. The process of claim 16 wherein the polyolefin is polypropylene.

18. The process of claim 16 wherein the sulfonate is a mixture of sulfonates represented by Formula I, and M is an alkali metal.

19. The process of claim 18 wherein the average of n is from 1 to about 2 and the alkali metal is sodium or potassium.

20. The process of claim 18 wherein from about 2 to 10% by weight of the metal sulfonate is included in the polyolefin.

21. The process of claim 18 wherein R is an aliphatic group containing at least about 8 carbon atoms.

22. The process of claim 21 wherein R is an aliphatic group containing from about 10 to 24 carbon atoms.

23. The process of claim 18 wherein the sulfonate is a mixture of sulfonates wherein R is from about 12 to 18 carbon atoms.

* * * * *